United States Patent
Chung et al.

(10) Patent No.: US 10,750,899 B2
(45) Date of Patent: Aug. 25, 2020

(54) BREWING APPARATUS WITH AIR SUCTION FOR COLD EXTRACTION AND BREWING METHOD THEREOF

(71) Applicant: SANDORA HOUSEHOLD ELECTRIC APPLIANCES (SHENZHEN) LTD., Shenzhen (CN)

(72) Inventors: King Chiu Chung, Shenzhen (CN); Zhigang Zhu, Shenzhen (CN); Anhan Huang, Shenzhen (CN); Wai Hang Louie, Shenzhen (CN); Kwok Wai Wong, Shenzhen (CN)

(73) Assignee: SANDORA HOUSEHOLD ELECTRIC APPLIANCES (SHENZHEN) LTD., Shenzhen (CN)

( * ) Notice: Subject to any disclaimer, the term of this patent is extended or adjusted under 35 U.S.C. 154(b) by 158 days.

(21) Appl. No.: 15/942,909

(22) Filed: Apr. 2, 2018

(65) Prior Publication Data

US 2019/0150659 A1    May 23, 2019

(30) Foreign Application Priority Data

Nov. 17, 2017    (CN) .......................... 2017 1 1144471

(51) Int. Cl.
*A47J 31/043*    (2006.01)
*A47J 31/44*    (2006.01)
*A47J 31/06*    (2006.01)
*A47J 31/00*    (2006.01)

(52) U.S. Cl.
CPC ......... *A47J 31/4407* (2013.01); *A47J 31/002* (2013.01); *A47J 31/043* (2013.01); *A47J 31/06* (2013.01)

(58) Field of Classification Search
CPC .... A47J 31/002; A47J 31/461; A47J 31/4403; A47J 31/44; A47J 31/46; A47J 31/4407; A47J 31/06; A47J 31/468; A47J 39/003; A47J 41/0033
See application file for complete search history.

(56) References Cited

U.S. PATENT DOCUMENTS

| | | | |
|---|---|---|---|
| 1,435,755 A * | 11/1922 | Stricker | F26B 9/06 34/194 |
| 2018/0192816 A1* | 7/2018 | Gormley | A47J 31/4403 |

* cited by examiner

*Primary Examiner* — Hong T Yoo
(74) *Attorney, Agent, or Firm* — Anova Law Group, PLLC (57) ABSTRACT

The present invention discloses a brewing apparatus with air suction for cold extraction and a brewing method thereof, the apparatus adopts a air suction device to suck air out of a pot body and achieves a subatmospheric environment, by adopting the subatmospheric environment together with the cold water, it is able to extract a plurality of brewing ingredients effectively, and be able to shorten an extraction period while improving an extraction efficiency, which is favorable for a popularization of cold extraction beverage, and the brewing apparatus with air suction for the cold extraction is convenient to use, having a low manufacturing cost. The apparatus is able to prepare a cold-extraction beverage ready just after a simple operation, thus having a good economic efficiency and practicality.

7 Claims, 14 Drawing Sheets

BREWING APPARATUS WITH AIR SUCTION FOR COLD EXTRACTION AND BREWING METHOD THEREOF

CROSS-REFERENCES TO RELATED APPLICATIONS

This application claims the priority of Chinese patent application no. 201711144471.X, filed on Nov. 17, 2017, the entire contents of all of which are incorporated herein by reference.

FIELD OF THE INVENTION

The present invention relates to the field of a preparation apparatus for a beverage, and more particularly, to a brewing apparatus with air suction for cold extraction and a brewing method thereof.

BACKGROUND

In the prior art, there are a plurality of beverage brewing methods, and most of them are brewed with hot water. Taking coffee as an example, usually, coffee is brewed by adopting a plurality of methods including a method of dripping from a filter paper, a method of using an Italian-styled machine, and a method of siphon, all of these methods listed above are using boiling water for a brewing purpose. However, brewing coffee with boiling water, on one hand, due to a high temperature of the water, causing it easy to soak out a plurality of sour and bitter substances inside the coffee, thus affecting a taste of the coffee, on other hand, in summer, a cold beverage is more popular than a hot beverage.

So people starts to use cold water to brew beverages, such as a cold brewed coffee (Dutch coffee) or a cold brewed tea, and when using cold water to brew tea or coffee, due to a low tannin content being extracted, there is no taste of astringency, specifically, a Dutch coffee tastes more smooth and delicious, while a cold extracted tea tastes more sweet and fragrant. However, cold extraction method takes a pretty long time, for example, an ordinary Dutch coffee needs a brewing time of more than 12 hours. Such a long brewing time is not conducive to a large number of sales of cold extracted beverages.

Therefore, the current technology needs to be improved and developed.

BRIEF SUMMARY OF THE DISCLOSURE

According to the above described defects, the purpose of the present invention is providing a brewing apparatus with air suction for cold extraction and a brewing method thereof, applied to achieving a low temperature brewing for the cold extraction, specifically, for an extraction of coffee, and improving an efficiency of the extraction.

In order to achieve the above mentioned goals, the technical solution of the present invention to solve the technical problems is as follows:

A brewing apparatus with air suction for cold extraction, wherein including:

a pot body, applied to disposing a plurality of brewing ingredients;

a cover body, matching and sealing an opening of the pot body;

an air suction device, arranged on the cover body, applied to sucking air out of the pot body and achieving a subatmospheric environment.

The brewing apparatus with air suction for the cold extraction, wherein it further comprises:

an opening, arranged on a lower part of the pot body;

a liquid outflow switch, connecting to the opening, under a control by the liquid outflow switch and the opening, an extracted liquid flows out through the liquid outflow switch.

The brewing apparatus with air suction for the cold extraction, wherein the liquid outflow switch comprising: an upper outflow device and a lower outflow device;

the upper outflow device comprising:

a piston with a spring sleeved on; a gasket sleeved on the piston; a first grommet sleeved on the piston and locating above the gasket, applied to fixing the piston; a filter disposed between the gasket and the opening; a first sealing ring disposed around the opening, for achieving a sealing between the opening and the gasket;

the lower outflow device comprising:

a rotary knob; a connection shaft connected to the rotary knob; an eccentric column connected to the connection shaft; a horizontal rod connected to the eccentric column, and touching the piston; when turning the rotary knob, the rotary knob drives the connecting shaft to rotate, the connecting shaft drives the eccentric column to rotate, a rotation of the eccentric column drives the horizontal rod to rise, the horizontal rod drives the piston to go up, and the liquid flows out from a first through hole.

The brewing apparatus with air suction for the cold extraction, wherein the liquid outflow switch is arranged on the pot body.

The brewing apparatus with air suction for the cold extraction, wherein the brewing apparatus further comprising:

a base, the lower outflow device is arranged on the base, and the upper outflow device is arranged on the pot body.

The brewing apparatus with air suction for the cold extraction, wherein further comprising:

a filter basket arranged in the pot body, applied to dispose the brewing ingredients; and, a filter cover matched with the filter basket.

The brewing apparatus with air suction for the cold extraction, wherein further comprising:

a hanging buckle column arranged around the filter basket; and, a hanging buckle arranged on an inner side of the pot body and matched with the hanging buckle column.

The brewing apparatus with air suction for the cold extraction, wherein further comprising:

a plurality of clamping posts arranged around a spout of the pot body;

a plurality of clamping protrusions arranged on the cover body, matching the plurality of clamping posts, applied to tightly closing the cover body and the pot body.

The brewing apparatus with air suction for the cold extraction, wherein the cover body further comprising:

a clamping slot, applied to disposing the air suction device;

a second sealing ring arranged between the cover body and the pot body.

A brewing method according to anyone of the brewing apparatus with air suction for the cold extraction, wherein comprising a plurality of following steps:

S100: close the pot body and the cover body, and seal the brewing ingredients with cold water in the pot body;

S200: start the air suction device to suck air out of the pot body, to achieve a subatmospheric environment, and keep for 10 seconds to 45 minutes;

S300: flow the extracted liquid out through the liquid outflow switch, when finishing extracting the brewing ingredients.

Comparing to the prior art, the present invention provides a brewing apparatus with air suction for cold extraction and a brewing method thereof, the apparatus adopts the air suction device to suck air out of the pot body, to achieve a subatmospheric environment, the subatmospheric environment may be an environment of a low pressure, a negative pressure or even a vacuum, the low pressure means around 1 bar, preferably means below 1 bar, the negative pressure means 0 bar to −1 bar. By adopting the subatmospheric environment together with the cold water, it is able to extract the plurality of brewing ingredients effectively, and be able to shorten an extraction period while improving an extraction efficiency, which is favorable for a popularization of cold extraction beverage, and the brewing apparatus with air suction for the cold extraction is convenient to use, having a low manufacturing cost. The apparatus is able to prepare a cold-extraction beverage ready just after a simple operation, thus having a good economic efficiency and practicality.

DETAILED DESCRIPTION OF EMBODIMENTS

The present invention provides a brewing apparatus with air suction for cold extraction and brewing method thereof, in order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
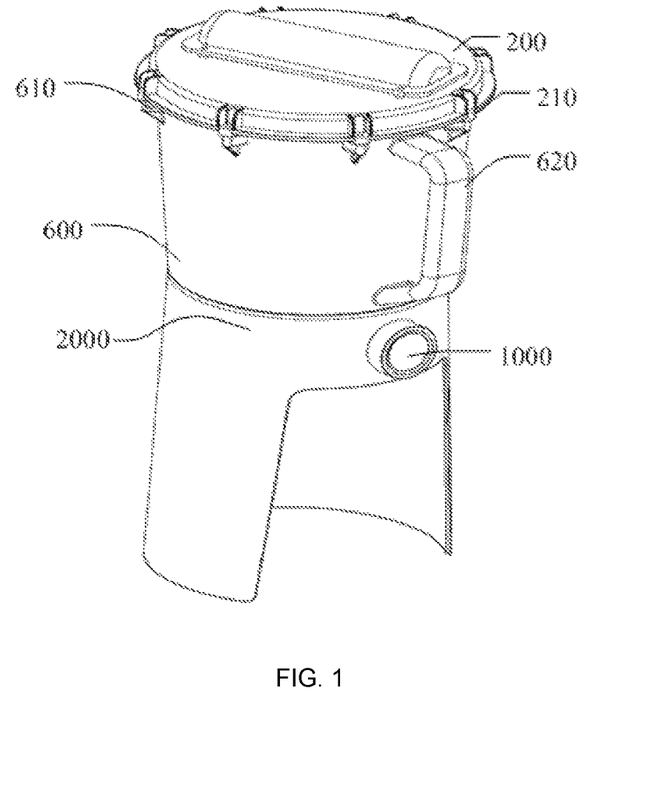
FIG. 1 illustrates a stereo diagram of an embodiment of the brewing apparatus with air suction for cold extraction as provided by the present invention.
Figure 2:
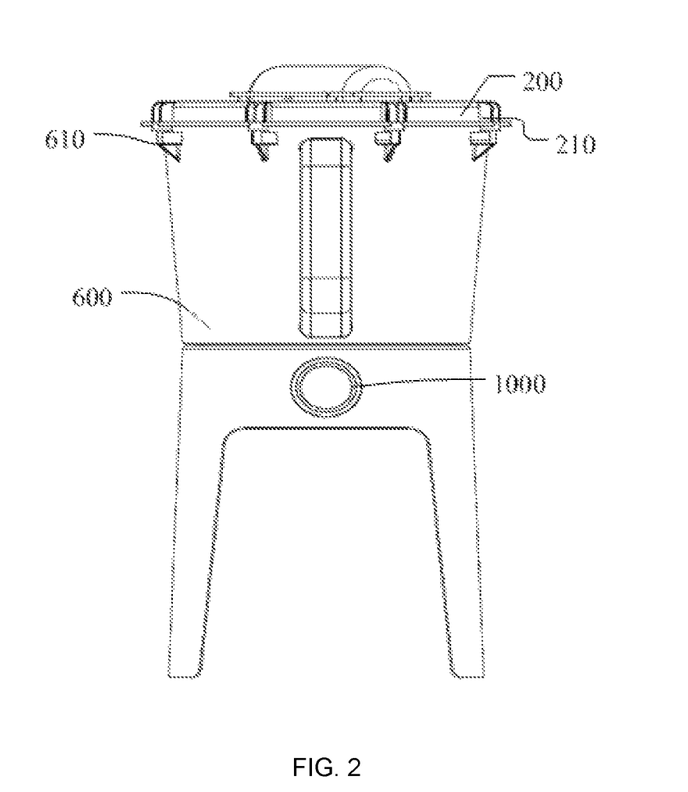
FIG. 2 illustrates a front view of the embodiment of the brewing apparatus with air suction for cold extraction as provided by the present invention.

The present invention provides a brewing apparatus with air suction for cold extraction, shown as FIG. 1 and FIG. 2, the brewing apparatus with air suction for cold extraction comprises a pot body 600, a cover body 200 and a air suction device. Shown as FIG. 3, the air suction device comprises an air pump 100 and a catheter 110. The cover body 200 has a clamping slot 220 arranged, the clamping slot 220 is applied to disposing the air pump 100 and the catheter 110, while it may further arrange a clamping slot cover 230 covering the clamping slot 220. In the clamping slot 220, there is an air hole arranged, one end of the catheter 110 connects to the air pump 100, and another end extends to the pot body 600 through the air hole, acting as a pathway for the air pumped out by the air pump 100. In order to maintain an integral integrity of the apparatus, and facilitate a movement and preservation of the apparatus, it may further arrange a handle on the pot body 600 or the cover body 200, to facilitate handling the apparatus, such as a handle 620 on the pot body 600.

Figure 3:
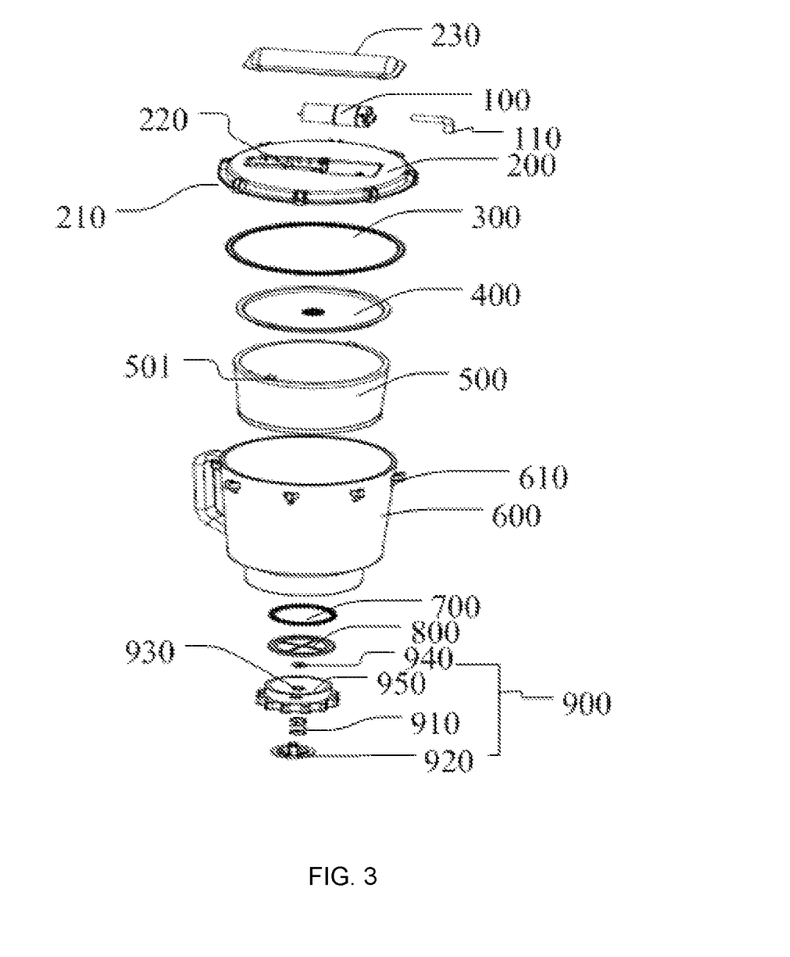
FIG. 3 illustrates an explored diagram of the embodiment of the brewing apparatus with air suction for cold extraction as provided by the present invention.
Figure 6:
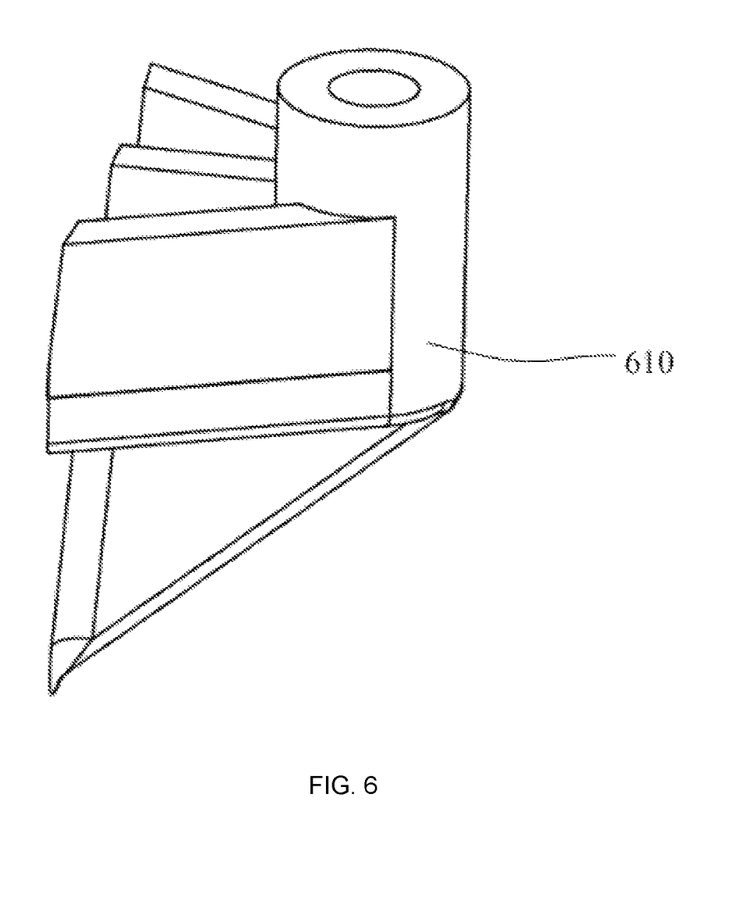
FIG. 6 illustrates a partial enlargement diagram of the embodiment of the brewing apparatus with air suction for cold extraction as provided by the present invention.
Figure 7:
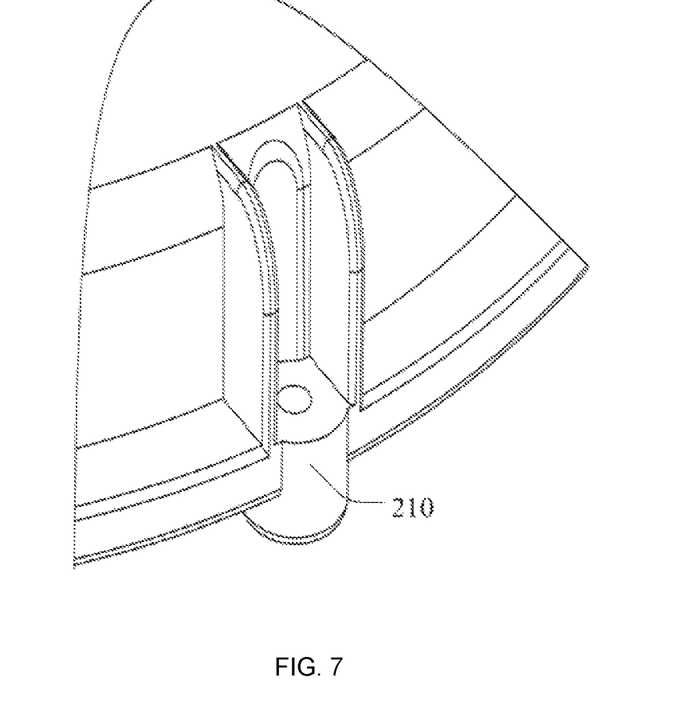
FIG. 7 illustrates a partial enlargement diagram of the embodiment of the brewing apparatus with air suction for cold extraction as provided by the present invention.

When closing the cover body 200 and the pot body 600, and starting the air pump 100, the air pump 100 sucks air out of the pot body through the catheter 110, and discharges to outside of the pot body 600, which is able to generate a low pressure of about 1 bar in the pot body, preferably, the low pressure means below 1 bar, and most preferably, it adopts a negative pressure, the negative pressure means lower than 0 bar, preferably between 0 and −1 bar, so as to facilitate speeding up a process of cold extraction in the pot body 600. Preferably, as shown in FIG. 6 and FIG. 7, around a spout of the pot body 600, there are a plurality of clamping posts 610 arranged, and on the cover body 200, a position of a plurality of clamping protrusions 210 is corresponding to that of the plurality of clamping posts 610, thus the plurality of clamping protrusions 210 and the plurality of clamping posts 610 are matching and snap connecting accordingly, in such a way, when closing the cover body 200 and the pot body 600, the plurality of clamping protrusions 210 and the plurality of clamping posts 610 are interlocking each other, making the pot body 600 and the cover body 200 close more tightly, forming a sealed structure. Further, as shown in FIG. 3, inside the cover body 200, it may have a second sealing ring 300 arranged, applied to further sealing a matching gap between the cover body 200 and the pot body 600, which facilitates to form a subatmospheric environment when sucking air out. The subatmospheric environment may be around 1 bar, or lower than 1 bar, preferably, it is close to a vacuum or a negative pressure, the negative pressure means lower than 0 bar, preferably between 0 and −1 bar, which relies mainly on a work ability of the air pump selected.

Figure 5:
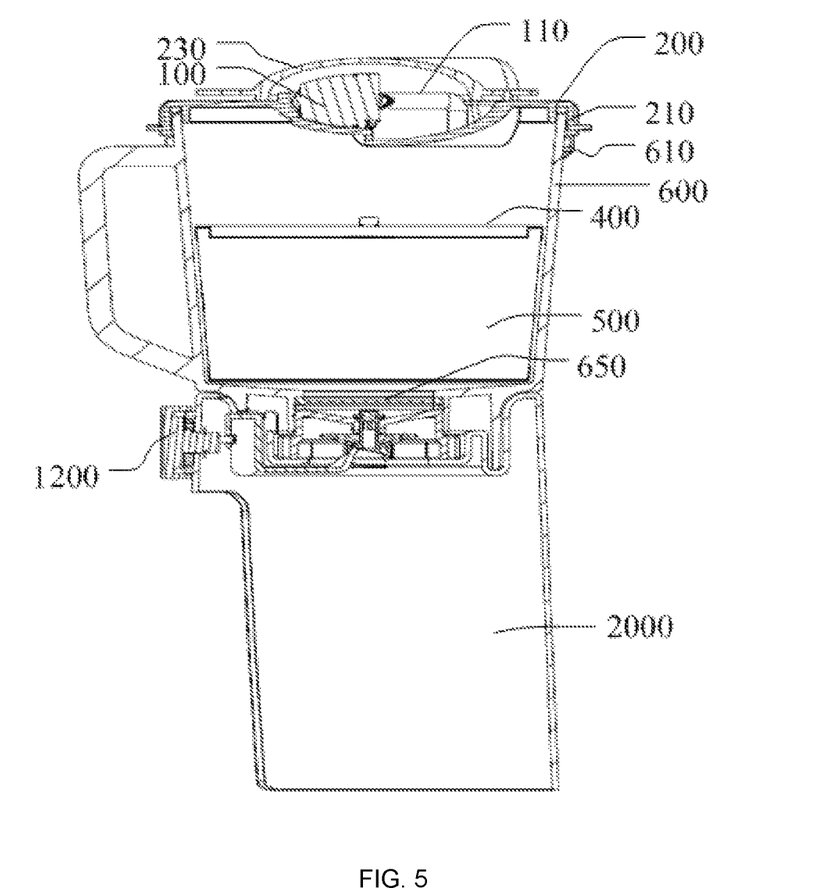
FIG. 5 illustrates a sectional view of the embodiment of the brewing apparatus with air suction for cold extraction as provided by the present invention.

As shown in FIG. 3 and FIG. 5, the brewing apparatus with air suction for cold extraction further comprises a filter basket 500 and a filter cover 400, the filter basket 500 may be applied to filtering the brewing ingredients, which may be manufactured by gauzes with different meshes, different sparse degrees, and arranged in the pot body 600, during an extraction process and a filtration process, try not to stir the brewing raw ingredients, such as tea or coffee powder, so as to avoid a plurality of ingredients affecting a taste entering a liquid, such as a residue. For example, when disposing the coffee powder into the filter basket 500 for a filtration according to the present invention, a filtration residue after extraction is locating in the filter basket 500, and may be taken out together with the filter basket 500, shown as FIG. 3, and subject to a further filtration by a filter 800 in a liquid exit pathway below the pot body 600. Most of the brewing ingredients are not able to flow with a filtrate to the filter 800, while a little of the brewing ingredients may subject to a further filtration by the filter 800. During a flowing process of the brewing ingredients, ingredients that may affect the taste are mainly solid ingredients, when extracting to a liquid, take the coffee powder as an example, if the residue of the coffee powder flows with the filtrate, it is easy to extract a plurality of ingredients including tannin and more in the coffee powder, which makes the taste of the coffee more sour and bitter.

The filter cover 400 together with the filter basket 500 may form an accommodate space for the brewing ingredients, on one hand, it may filter the brewing ingredients, such as tea or coffee, the tea may float and spread out after brewing, and overflow from an opening of the filter basket 500 to the filtrate, same does the coffee powder, which is able to lower an effect of the filtration, the brewing ingredients overflowed will flow with the filtrate, affecting the taste; on another hand, if not adopting the filter cover 400 for a sealing, due to the brewing ingredients may float on water after adding water, such an extraction has a low efficiency. Disposing the brewing ingredients into the filter basket 500, covering with the filter cover 400, before placing the filter basket 500 into the pot body 600, and adding water till submerging the filter basket 500, after such an operation, during the filtration process, it is able to be sure that the brewing ingredients are always disposed in water, which is able to improve the filtration efficiency significantly. Preferably, as shown in FIG. 3, around an opening of the filter basket 500, a plurality of hanging buckle columns 501 are arranged, and on an inner side of the pot body 600, a plurality of hanging buckles are arranged in a plurality of corresponding positions, through a matching and snap connection between the hanging buckles and the hanging buckle columns 501, the filter basket 500 may be hanged and fixed directly inside the pot body 600, facilitating to fixing and taking the filter basket 500.

Shown as FIG. 5, on a bottom of the pot body 600 according to the present invention, an opening 650 is arranged, and acting as an exit for an extracted liquid, the opening 650 connects to a liquid outflow switch, which is applied to controlling the extracted liquid flow out, for example, when the extraction is finished, and the liquid outflow switch is turned open, the extracted liquid will flow out from the liquid outflow switch, and after a collection, the liquid is able to be applied for using and drinking.

Herein, the liquid outflow switch may be designed according to a real case, a structure of the liquid outflow switch is described below referencing to two embodiments.

Shown as FIG. 3, FIG. 4, FIG. 5 and FIG. 6, the liquid outflow switch may be divided into an upper outflow device 900 and a lower outflow device 1000, the upper outflow device 900 comprises a first grommet 940, a gasket 950, a spring 910, and a piston 920. The gasket 950 has a first through hole 930 arranged, the piston 920 has the spring 910 sleeved on, and passes through the first through hole 930, the first grommet 940 sleeves on the piston 920 passing through the first through hole 930, in such a way, the first grommet 940 clamping the piston 920, and seals a gap between the piston 920 and the first through hole 930. Preferably, between the opening 650 and the gasket 950, there is a filter 800 and a first sealing ring 700 arranged, the filter 800 is applied to filtrating the filtration in a second time, so as to avoid any tiny filtration residue entering the filtrate, the first sealing ring 700 is applied to sealing the opening 650, and avoiding the opening 650 leaking when the air pump 100 is sucking air out.

Figure 4:
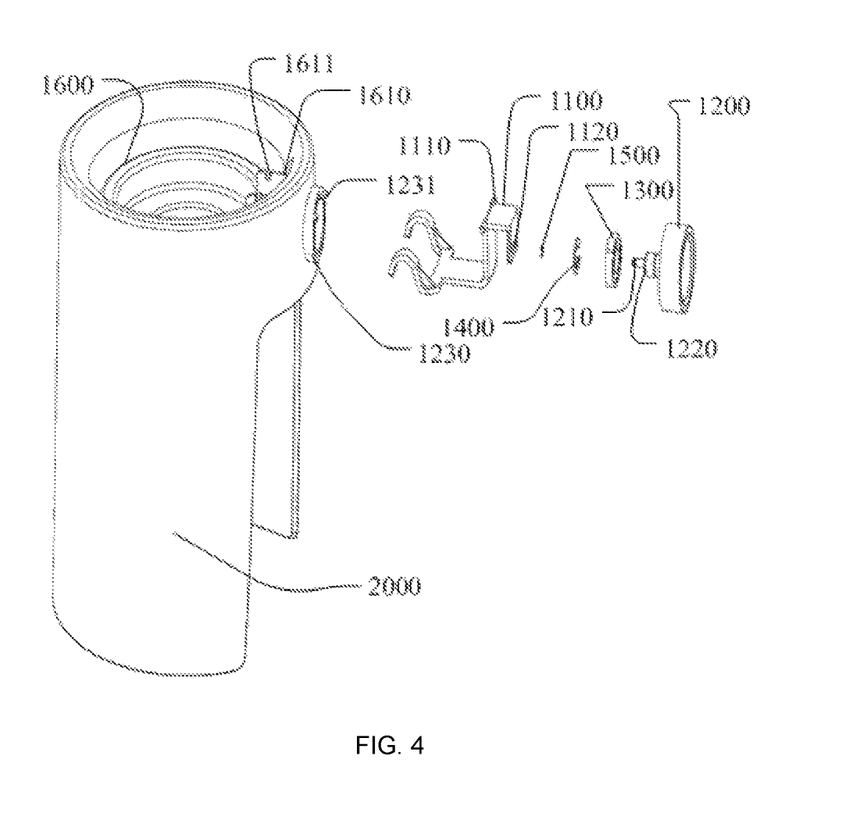
FIG. 4 illustrates an explored diagram of the embodiment of the brewing apparatus with air suction for cold extraction as provided by the present invention.
Figure 8:
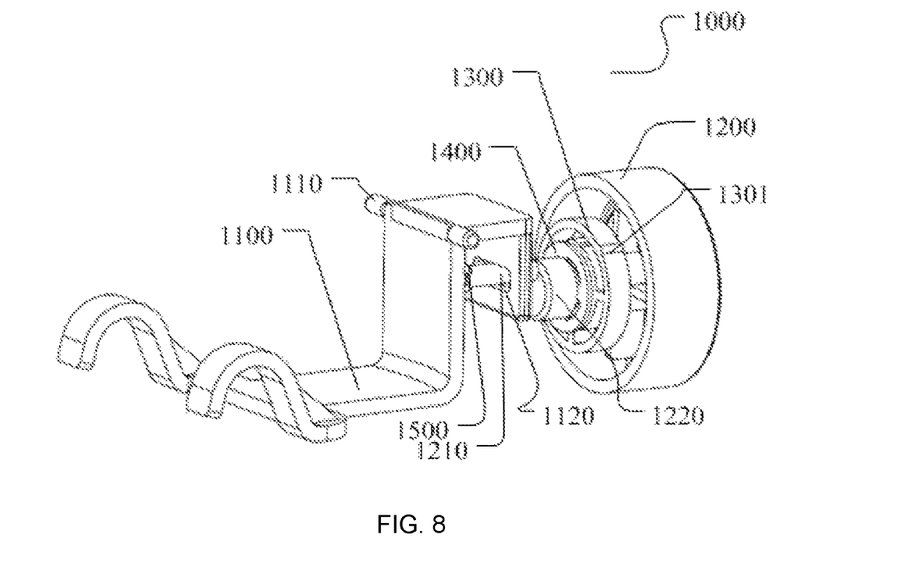
FIG. 8 illustrates a diagram on a use state of a lower outflow device of another embodiment of the brewing apparatus with air suction for cold extraction as provided by the present invention.
Figure 9:
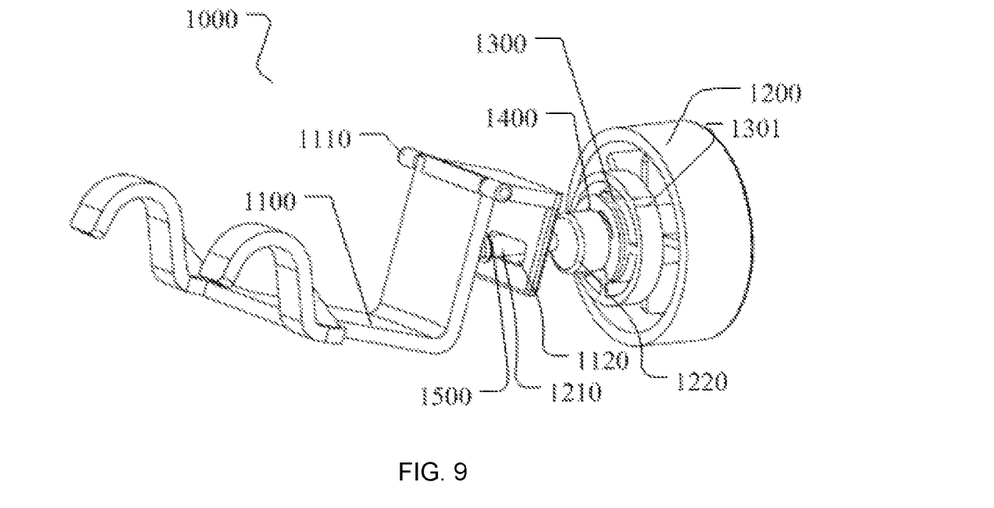
FIG. 9 illustrates a diagram on a use state of a lower outflow device of the other embodiment of the brewing apparatus with air suction for cold extraction according to the present invention.

Shown as FIG. 4, FIG. 8 and FIG. 9, the lower liquid outflow device 1000 comprises a knob 1200, a second grommet 1300, a first C shaped grommet 1400, a second C shaped grommet 1500, a horizontal rod 1100. The knob 1200 further comprises a connection shaft 1220 and an eccentric column 1210, a connection column 1110 protruded from the horizontal rod 1100, the horizontal rod 1100 further has a square slot 1120 arranged. The second grommet 1300 has a first extrusion 1301 arranged.

Shown as FIG. 4 and FIG. 5, the lower liquid outflow device 1000 is arranged on a base 2000. The base 2000 has a second through hole 1600, applied to disposing the pot body 600, the second through hole 1600 has a clamping chip 1610 arranged inside, applied to disposing the horizontal rod 1100, the clamping chip 1610 has a clamping slot 1611 matching the connection column 1110. The base 2000 has an interface 1230, and a position of the interface 1230 points to that of the clamping chip 1610, above an outer ring of the interface 1230, it has two first limiting columns 1231 arranged. Disposing the horizontal rod 1100 into the second through hole 1600, and the connection column 1110 connects to the clamping slot 1611.

Followed by the connection shaft 1220 inserts into the interface 1230 after being sleeved by the second grommet 1300 and the first C shaped grommet 1400 in a sequence, the eccentric column 1210 connecting to the connection shaft 1220 passes through the interface 1230 and reaches an inner side of the second through hole 1600, and finally the square slot 1120 and the second C shaped grommet 1500 are sleeved on the eccentric column 1210. The first C shaped grommet 1400 is applied to fixing the second grommet 1300, and avoiding the second grommet 1300 falling off the connection shaft 1220 when in use. The second C shaped grommet 1500 is applied to avoiding the eccentric column 1210 falling off the square slot 1120 when in use.

When turning the knob 1200, it drives the eccentric column 1210 moving from the highest point to the lowest point, now, a tail of the horizontal rod 1100 will rise up, preferably, the tail of the horizontal rod 1100 has an upward arched rod, in order to facilitate having a good touch with the piston 920 when going up. Shown as FIG. 9, the tail of the horizontal rod 1100 touches the piston 920, when the tail of the horizontal rod 1100 is arched up, the piston 920 will move upwards, now the first grommet 940 sleeved on the piston 920 will also move upward following the piston 920, now the piston 920 and the first through hole 930 has a gap, and liquid will flow out from the gap, after a collection, an extracted beverage is acquired.

Figure 10:
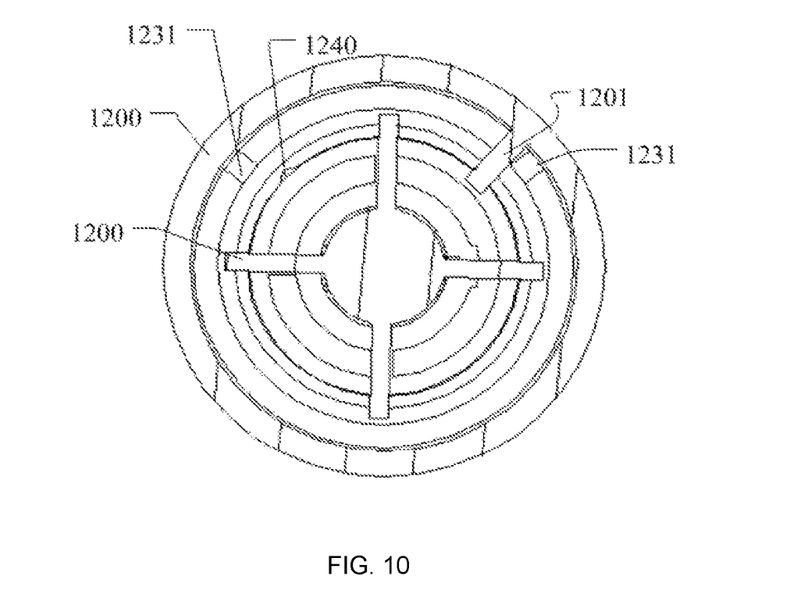
FIG. 10 illustrates a sectional view on a knob of the other embodiment of the brewing apparatus with air suction for cold extraction as provided by the present invention.
Figure 11:
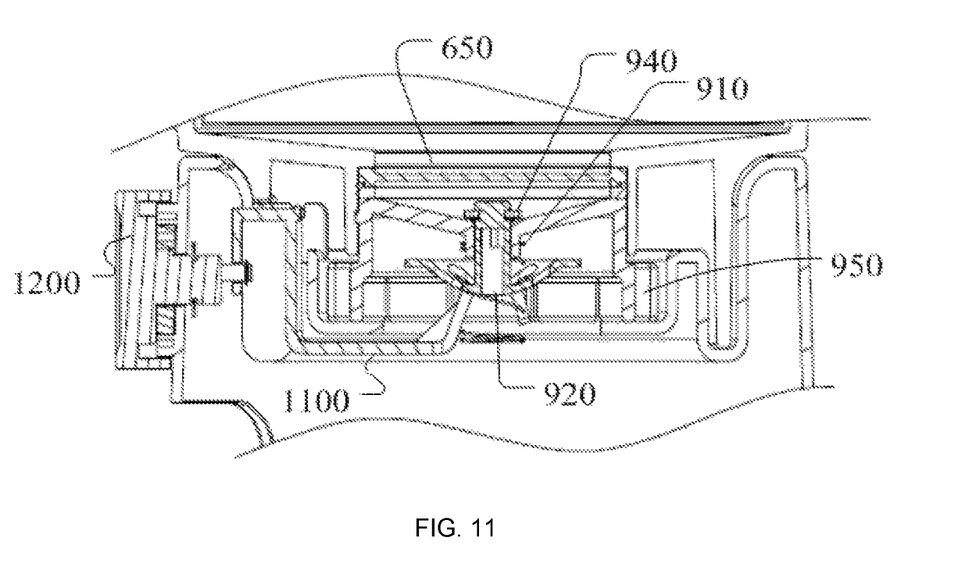
FIG. 11 illustrates an enlargement diagram on an interface of the upper outflow device and the lower outflow device of the other embodiment of the brewing apparatus with air suction for cold extraction as provided by the present invention.
Figure 12:
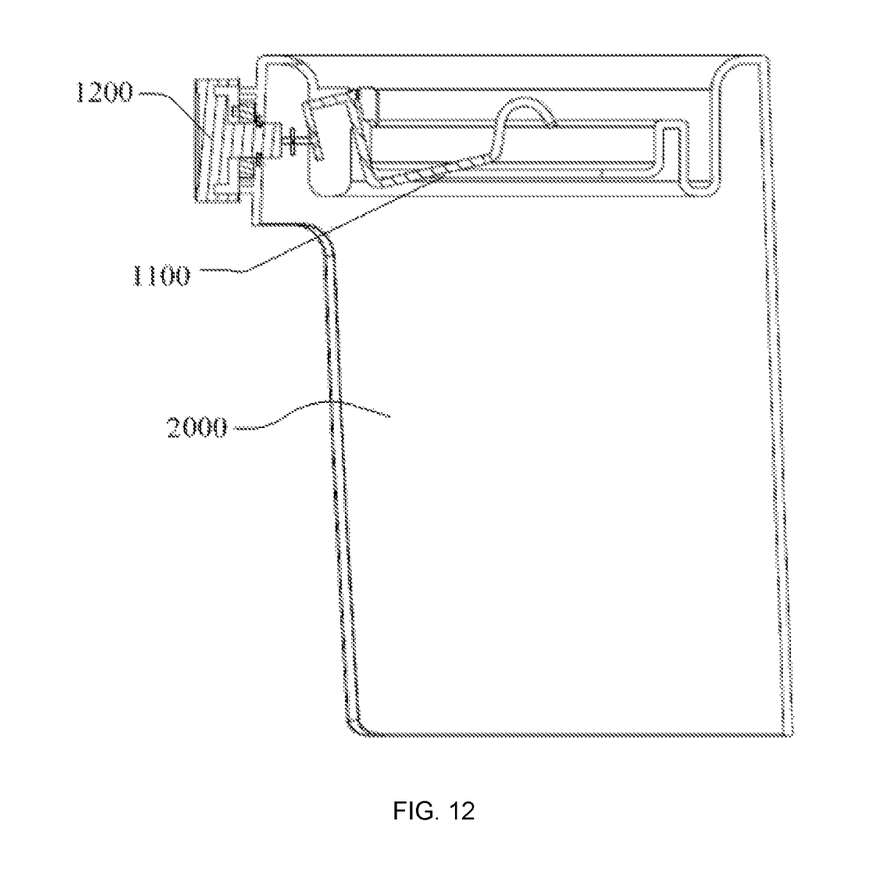
FIG. 12 illustrates a sectional diagram on a base of the other embodiment of the brewing apparatus with air suction for cold extraction as provided by the present invention.

Further, FIG. 10 is a sectional front view on the interface after arranging the lower outflow device 1000, shown as the FIG. 10, there are two first limiting columns 1231 arranged on an outer ring of the interface 1230, while an inner side of the knob 1200 has a second limiting column 1201 arranged, when the knob 1200 matches the interface 1230, the second limiting column 1201 locates in between two of the first limiting columns 1231, therefore a rotation range of the knob 1200 is limited in a range between two of the first limiting columns 1231. Therefore a moving range of the horizontal rod 1100 is controlled, and avoiding that an overlarge movement range may break a plurality of other parts. In an inner ring of the interface 1230, there is a dent 1240 arranged, which matches the first extrusion 1301 on the second grommet 1300, in such a way, when the knob 1200 is turned to a suitable position, when the first extrusion 1301 is disposed into the dent 1240, the knob 1200 may be disposed at the position, since there is no human power to keep a rotation position of the knob 1200, thus without any human power, it can still maintain the tail of the horizontal rod 1100 arched up, and maintain the position 920 in an opening state.

Until the liquid is finished collection, turn back the knob 1200 again, the first limiting column 1231 is turned back to the second limiting column 1201 on the another side, driving the eccentric column 1210 moving from the lowest point to the highest point, shown as FIG. 8, thus the tail of the horizontal rod 1100 turns back to the horizontal state as a following. The piston 920 touched with the horizontal rod 1100 turns back to an original position under an action of gravity, and the first grommet 940 seals again the gap between the piston and the first through hole 930, and closes the liquid outflow switch.

Figure 13:
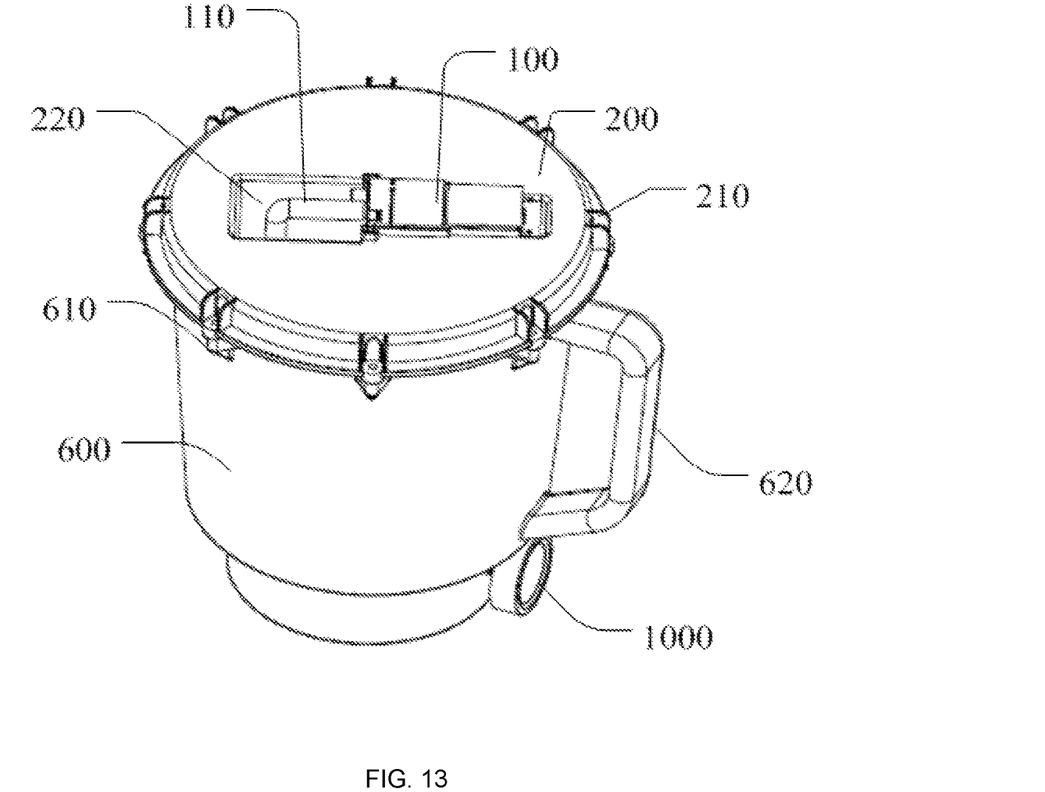
FIG. 13 illustrates a stereo diagram of the other embodiment of the brewing apparatus with air suction for cold extraction as provided by the present invention.
Figure 14:
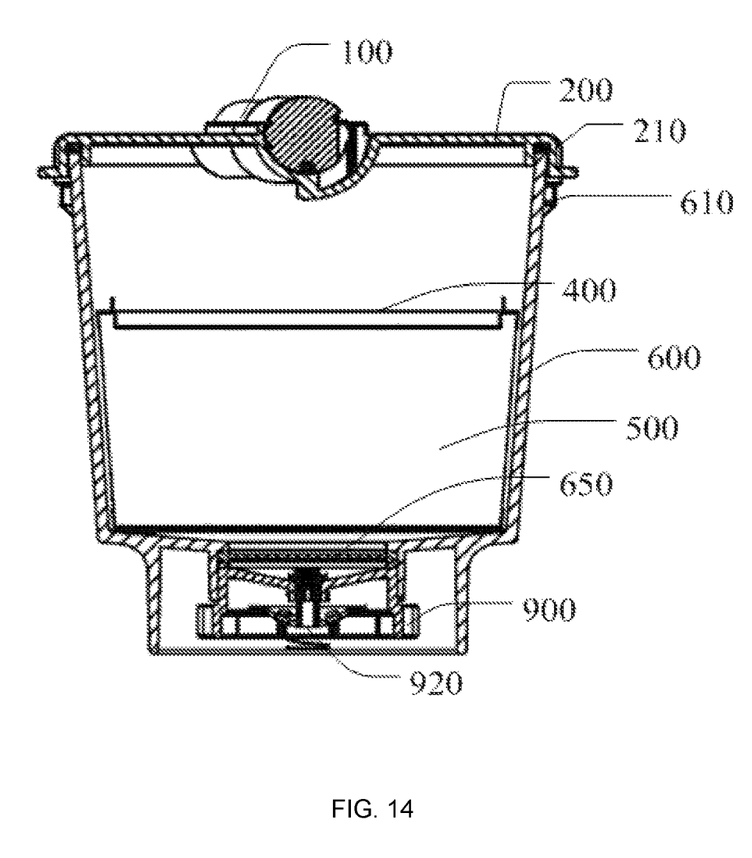
FIG. 14 illustrates a sectional view of the other embodiment of the brewing apparatus with air suction for cold extraction as provided by the present invention.
Figure 15:
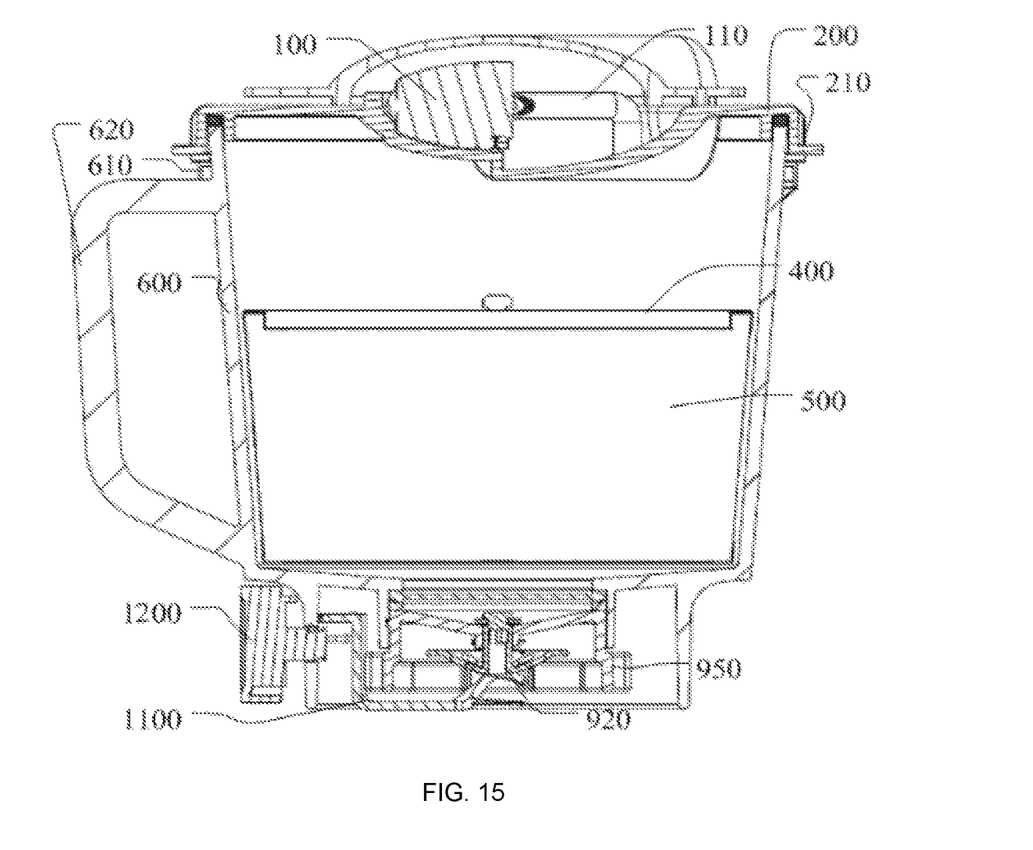
FIG. 15 illustrates a sectional view of the other embodiment of the brewing apparatus with air suction for cold extraction as provided by the present invention.

Shown as FIG. 13, the present invention provides another embodiment, different to the first embodiment, the interface 1230 and the lower liquid outflow device 1000 are locating at a position of a spout of the pot body 600, shown as FIG. 14 and FIG. 15, following a same principle as the first embodiment, arranging the lower outflow device 1000 at the position of the interface 1230, turning the knob 1200 may arch up the tail of the horizontal rod 1100, now lifting the piston 920 touching with the horizontal rod 1100, the liquid will flow out following the gap between the piston 920 and the first through hole 930.

The present invention adopts two liquid outflow switches including the lower outflow device and the upper outflow device to use together, due to after air suction, a pressure in the pot body 600 is lower than an atmospheric pressure of an outer circumstance, if using a regular switch, due to an inner pressure is lower than an outer pressure, it may cause pretty hard to open an switch, while when the out pressure is larger than the inner pressure, pushing the piston 920 is relatively power saving, which makes opening the liquid outflow switch relatively convenient and fast.

The present invention adopts an air suction device to suck air out of the pot body, to achieve a subatmospheric environment, thus even adopting cold water is able to fast extract the brewing ingredients, be able to shorten an extraction time and improve an extraction efficiency, also, the cold extracted beverage is able to have a good taste, avoiding extracting a plurality of ingredients having a bad taste due to an excessive mixing as in a traditional cold extraction, such as the tannin in the coffee, which is favorable for a popularization of cold extraction beverage, and the brewing apparatus with air suction for the cold extraction is convenient to use, having a low manufacturing cost. The apparatus is able to prepare a cold-extraction beverage ready just after a simple operation, thus having a good economic efficiency and practicality.

Figure 16:
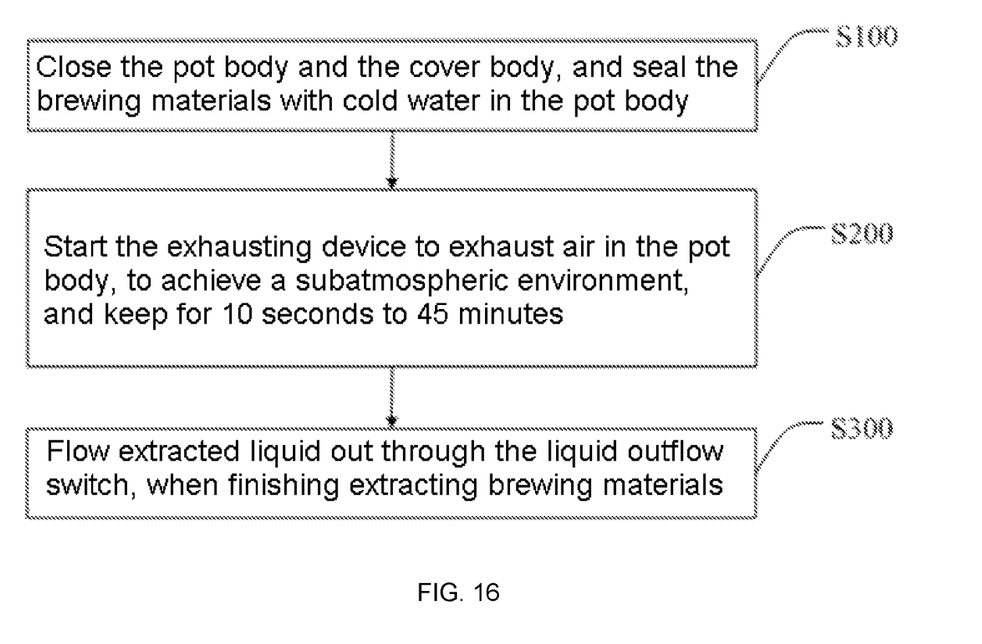
FIG. 16 illustrates a flow chart on using the brewing apparatus with air suction for cold extraction as provided by the present invention.

As shown in FIG. 16, the present invention further provides a brewing method by using the brewing apparatus with air suction for the cold extraction, which comprises a plurality of following steps:

S100: disposing the brewing ingredients into the pot body 600, covering with the cover body 200, adding cold water, and closing the pot body 600 and the cover body 200;

S200: starting the air suction device to suck air out of the pot body 600, to form a subatmospheric environment in the pot body 600, and even close to a low pressure or a vacuum circumstance;

S300: closing the air suction device, opening the liquid outflow switch, and collecting the liquid outflow from the liquid outflow switch.

The brewing method is described below with reference to an embodiment, first disposing the brewing ingredients, such as coffee, into the filter basket 500, covering with the filter cover 400, disposing the filter basket 500 together with the filter cover 400 into the pot body 600, preferably, around the opening of the filter basket 500, there are a plurality of hanging buckle columns 501 arranged, and a plurality of hanging buckles are arranged in a plurality of corresponding positions, in such a way, the filter basket 500 may be hanged and fixed directly inside the pot body 600, facilitating to fixing and taking the filter basket 500, followed by adding suitable cold water, whose amount is according to a brewing requirement, then closing the cover body 200, and clamping the clamping protrusions 210 of the cover body 200 to the clamping columns 610 on the pot body 600, followed by starting the air pump 100, sucking air out of the pot body 600, after a certain time, preferably, after waiting for 10 seconds to 45 minutes, a waiting time is related to the subatomospheric environment in the pot body 600, the lower of the air pressure in the pot body 600, the shorter of a waiting time. For example, when the air pressure in the pot body 600 is 1 bar, the waiting time required is around 30 minutes, while adopting a negative pressure, such as −0.5 bar, maybe only one minute is needed. Turning off the air pump 100, and opening the liquid outflow switch, to outflow and collect the extracted liquid, for example, the knob 1200 may be turned, and the liquid is able to flow out, while turns the knob 1200 back to stop outflow of the liquid.

A plurality of technical features and technical effects of the method have been described in the corresponding brewing apparatus with air suction for cold extraction, and will not be described any further here. The pot body of the present invention is made of a structure and a material resistant to pressure, which is similar to the structure and the material of a pressure cooker commonly found in a market today, therefore, applying to a coffee maker or a brewing pot, it is a relatively novel product and technical solution.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A brewing apparatus with air suction for cold extraction, wherein including:
   a pot body, applied to disposing a plurality of brewing ingredients;
   a cover body, matching and sealing an opening of the pot body;
   an air suction device, arranged on the cover body, applied to sucking air out of the pot body and achieving a subatmospheric environment;
   an opening, arranged on a lower part of the pot body;
   a liquid outflow switch, connecting to the opening, under a control by the liquid outflow switch and the opening, an extracted liquid flows out through the liquid outflow switch;
   wherein:
      the liquid outflow switch includes an upper outflow device and a lower outflow device;
      the upper outflow device includes: a piston with a spring sleeved on; a gasket sleeved on the piston; a first grommet sleeved on the piston and locating above the gasket, applied to fixing the piston; a filter disposed between the gasket and the opening; and a first sealing ring disposed around the opening, for achieving a sealing between the opening and the gasket; and
      the lower outflow device comprising: a rotary knob; a connection shaft connected to the rotary knob; an eccentric column connected to the connection shaft; a horizontal rod connected to the eccentric column, and touching the piston; when turning the rotary knob, the rotary knob drives the connecting shaft to rotate, the connecting shaft drives the eccentric column to rotate, a rotation of the eccentric column drives the horizontal rod to rise, the horizontal rod drives the piston to go up, and the liquid flows out from a first through hole.

2. The brewing apparatus according to claim 1, wherein the liquid outflow switch is arranged on the pot body.

3. The brewing apparatus according to claim 1, wherein the brewing apparatus further comprising:
   a base, the lower outflow device is arranged on the base, and the upper outflow device is arranged on the pot body.

4. The brewing apparatus according to claim 1, further comprising:
   a filter basket arranged in the pot body, applied to dispose the brewing ingredients; and,
   a filter cover matched with the filter basket.

5. The brewing apparatus according to claim 4, further comprising:
   a plurality of hanging buckle columns arranged around the filter basket; and,
   a plurality of hanging buckles arranged on an inner side of the pot body and matched with the plurality of hanging buckle columns.

6. The brewing apparatus according to claim 1, further comprising:
   a plurality of clamping posts arranged around a spout of the pot body;
   a plurality of clamping protrusions arranged on the cover body, matching the plurality of clamping posts, applied to tightly closing the cover body and the pot body.

7. The brewing apparatus according to claim 1, wherein the cover body further comprises:
   a clamping slot, applied to disposing the air suction device;
   a second sealing ring arranged between the cover body and the pot body.

* * * * *